(12) United States Patent
Crow et al.

(10) Patent No.: US 6,665,661 B1
(45) Date of Patent: Dec. 16, 2003

(54) SYSTEM AND METHOD FOR USE IN TEXT ANALYSIS OF DOCUMENTS AND RECORDS

(75) Inventors: Vernon L. Crow, Richland, WA (US); Randall E. Scarberry, Richland, WA (US); Augustin J. Calaprist, Richland, WA (US); Nancy E. Miller, San Diego, CA (US); Grant C. Nakamura, Kennewick, WA (US); Jeffrey D. Saffer, Richland, WA (US)

(73) Assignee: Battelle Memorial Institute, Columbus, OH (US)

( * ) Notice: Subject to any disclaimer, the term of this patent is extended or adjusted under 35 U.S.C. 154(b) by 85 days.

(21) Appl. No.: 09/672,599

(22) Filed: Sep. 29, 2000

(51) Int. Cl.$^7$ .............................................. G06F 17/30
(52) U.S. Cl. .................................................. 707/3; 707/2
(58) Field of Search ...................... 707/2–3, 1

(56) References Cited

U.S. PATENT DOCUMENTS

| | | | |
|---|---|---|---|
| 5,276,616 A | | 1/1994 | Kuga et al. ............ 364/419.08 |
| 5,325,298 A | * | 6/1994 | Gallant ........................... 704/9 |
| 5,675,819 A | * | 10/1997 | Schuetze ....................... 704/10 |
| 5,926,811 A | | 7/1999 | Miller et al. .................... 707/5 |
| 5,963,965 A | | 10/1999 | Vogel ........................ 707/501 |
| 6,233,571 B1 | * | 5/2001 | Egger et al. ..................... 707/2 |
| 6,263,337 B1 | * | 7/2001 | Fayyad et al. .................. 707/3 |
| 6,301,579 B1 | * | 10/2001 | Becker ........................ 345/440 |

OTHER PUBLICATIONS

Author: Bjornar Larsen & Chinatsu Aone Title Date: 1999 Title: "Fast and effective text mining using linear–time document clustering", pp. 16–22.*

* cited by examiner

*Primary Examiner*—Safet Metjahic
*Assistant Examiner*—Haythim J. Alaubaidi
(74) *Attorney, Agent, or Firm*—Finnegan, Henderson, Farabow, Garrett & Dunner, LLP

(57) ABSTRACT

Methods and systems are provided that enable text in various sections of data records to be separately catalogued, indexed, or vectorized for analysis in a text visualization and mining system. A text processing system receives a plurality of data records, where each data record has one or a plurality of attribute fields associated with the records. The attributes fields containing textual information are identified. The specific textual content of each attribute field is identified. An index is generated that associates the textual content contained in each attribute field with the attribute field containing the textual content. The index is operable for use in text processing. The plurality of data records may be located in a data table and the textual information may be contained within cells of the data table. In another aspect, a plurality of data records is received, where at least some of the data records contain text terms. A first method is applied to weight text terms of the data records in a first manner to aid in distinguishing records from each other in response to selection of the first method. A second method is applied to weight text terms of the data records in a second manner to aid in distinguishing records from each other in response to selection of the second method. A vector is generated to distinguish each of the data records based on the text terms weighted by either the first or second method.

17 Claims, 4 Drawing Sheets

SYSTEM AND METHOD FOR USE IN TEXT ANALYSIS OF DOCUMENTS AND RECORDS

I. FIELD OF THE INVENTION

This invention relates generally to the methods and systems for analyzing data records and, more particularly, to methods and systems for mining text information.

II. BACKGROUND OF THE INVENTION

Large volumes of data have become more accessible particularly with the increased data access capabilities of the Internet. The traditional method of manually reading large volumes of documents to analyze the content and relevance is often too time consuming for most.

A number of methods have been developed for evaluating text documents. These methods typically require a document to be in electronic form to enable a computerized search and comparison of terms. At a rudimentary level, a user simply inputs query words or phrases into a system, and documents matching the query are returned. However, the user must manually read the returned documents to determine the content or relatedness of the documents. At a more sophisticated level, methods or algorithms have been developed that evaluate the association of words in documents and/or the content of documents, from which comparisons are made and reported to a user.

These methods, however, have been limited to analyzing text from a particular type of document. Furthermore, these text processing techniques do not enable a specific segment of the data to be analyzed individually nor in combination with other segments of the document. For example, patents contain several distinct sections, as do documents that are in table form, for which individual section comparisons may be desired. However, prior text-based analysis methods do not distinguish segments of such documents for comparison.

Text processing for text analysis includes two basic steps. First, the words used are indexed for rapid interactions and retrieval. Second, a vector, or high-dimensional mathematical signature, is created for each record. This vector is used for subsequent clustering and other analyses.

Many methods for text analysis rely on some method for feature extraction, that is, determination of which words are best for use in comparing one document against another or for cluster analysis. In one word-based approach, U.S. Pat. No. 5,325,298 discusses the derivation of context vectors (how each word associates—either positively or negatively—with other words in the overall vocabulary) and the subsequent derivation of summary vectors that describe each text document. All the context vectors are the same length and the summary vectors are also constrained to this same length. This method can also use predefined word lists. Common words (stopwords) are predefined and are eliminated as a means for keeping the context vectors small.

Similarly, Larsen and Aone, *Fast and effective text mining using linear-time document cluster,* Proceedings of the Fifth ACM SIGKDD International conference on Knowledge Discovery and Data Mining, pp. 16–22, 1999, also use word-based methods to define features. They extract a list of unique terms from each document, assign a weight to each of those terms, and represent the documents using the highest-weighted terms. After removing stopwords, they assign the term weights by term frequency and inverse document frequency.

In a variation of this approach, the words identified during feature extraction were used in one dimension of a two-dimensional matrix with the other dimension being all words that discriminate document content. The values in the resulting matrix are the conditional probability that a document will contain both words represented at that position. (See, for example, Wise et al., *Visualizing the Non-Visual: Spatial analysis and interaction with information from text documents,* Proc IEEE Visualization 95, pp. 51–58, 1995; Wise, *The Ecological Approach to Text Visualization,* JASIS 50:1224–1233; Wise et al., *Visualizing the Non-Visual; Spatial Analysis and Interaction with Information From Text Documents,* Proc IEEE Visualization 95, N. Gerson, S. Eick (Eds.), IEEE Computer Society Press, Los Alamitos, Calif., pp. 51–58.

Instead of using the entire vocabulary as the basis for feature extraction, Conrad and Utt, *A System For Discovering Relationships By Feature Extraction From Text Database,* Proceedings of the Seventeenth Annual International ACM-SIGIR Conference on Research and Development in Information Retrieval, pp. 260–270, 1994, have described a concept-oriented approach. In this case, the method is focused on general features that can be recognized by relatively simple methods, such as people and locations.

Combining these word- and concept-based approaches, Dorre et al., *Text Mining: Finding Nuggets in Mountains of Textual Data,* Proceedings of the Fifth ACM SIGKDD International Conference on Knowledge Discovery and Data Mining, pp. 398–401, 1999, describe a feature extraction method that is employed in IBM's Intelligent Miner for Text. This approach recognizes and classifies significant vocabulary items using methods for recognition of proper names and pattern matching. The methods automatically classify names, organizations, and places, multiword terms, abbreviations, numerical forms of numbers, and several other features. This information is then used for clustering the text documents as a means for grouping like documents together.

U.S. Pat. No. 5,963,965 to Vogel discusses a method that generates a list of words or phrases, together comprising the lexicon, with particular emphasis on two-word phrases. Each document is compared to the lexicon to generate an index, which can be optionally shortened through the use of a filter word list. The words and phrases are then grouped together to generate clusters based on predetermined relationship between the phrases.

The above methods are generally a single pass analysis. U.S. Pat. Nos. 5,687,364 and 5,659,766 to Saund et al. have also represented relationship between words and phrases as word clusters and association strength values. However, in this case, a training set of documents is used to iteratively test the correlation between current association values and topical content, with modification of the association strengths as needed.

Word-based methods can also be combined with other approaches. For example, U.S. Pat. No. 6,038,561 to Snyder et al. describes the combined multiple methods of analysis, where different representations of each document are used for comparison.

While prior text processing and analysis systems enable the analyses and comparisons of the text documents, these systems are directed to analyzing and comparing documents as a whole and of a particular type. The systems analyze the text of the document as a whole without analyzing the text as it pertains to distinct columns, cells, sections, or divisions. Thus, there is a need in the art for a text analysis and processing system that enables various divisions or sections of document to be separately analyzed.

III. SUMMARY OF THE INVENTION

Generally described, methods and systems consistent with the present invention provide a text analysis and processing system for that enables various divisions or sections of data records to be separately catalogued, indexed, or vectorized for analysis in a text processing system.

More particularly, a text processing method or system consistent with the present invention receives a plurality of data records, where each data record has a plurality of attribute fields associated with the records. The attribute fields containing textual information are identified. The specific textual content of each attribute field is identified. An index is generated that associates the textual content contained in each attribute field with the attribute field containing the textual content. The index is operable for use in text processing.

The plurality of data records may be located in a data table and the textual information may be contained within cells of the data table. The textual information is indexed in a manner that enables the textual information contained within different attribute fields to be compared. A vector may be generated that differentiates the content of data records based on textual content contained in the attribute fields. If desired, only a selected number of the attribute fields containing textual information are used to generate the vector. A user selectable command may be received for generating the index with textual information indexed either based on the case of the textual information or not based on the case of the textual information.

In another aspect consistent with the present invention, a plurality of data records is received, where at least some of the data records contain text terms. A first method is applied to weight text terms of the data records in a first manner to aid in distinguishing records from each other in response to selection of the first method. A second method is applied to weight text terms of the data records in a second manner to aid in distinguishing records from each other in response to selection of the second method. A vector is generated to distinguish each of the data records based on the text terms weighted by the first or second method that was selected.

The weighting may be based only on text terms corresponding to selected criteria. In the case of a data table, the selected criteria may be based on columns selected from the data table. The first and second methods may be topicality calculation methods.

IV. BRIEF DESCRIPTION OF THE DRAWINGS

V. DETAILED DESCRIPTION

Figure 1:
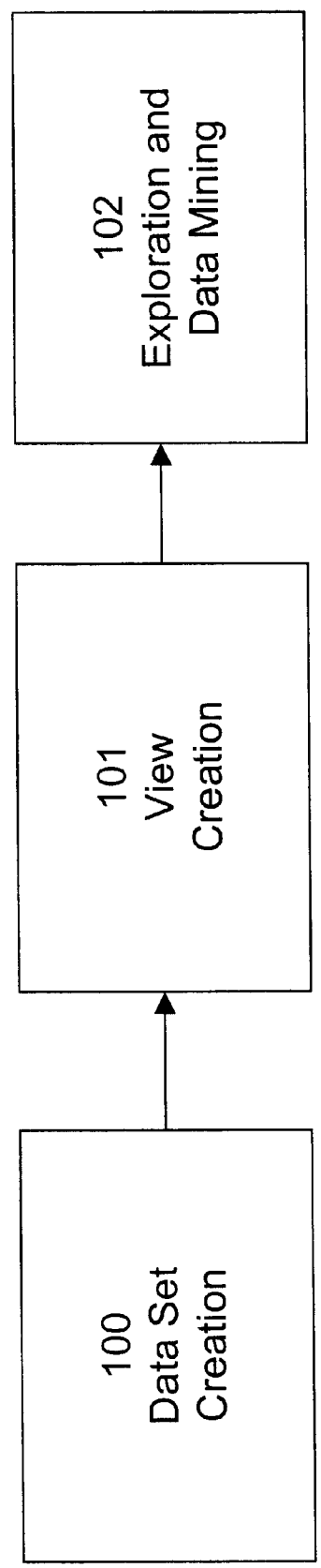
FIG. 1 is a block diagram of a data visualization and data mining system.

Reference will now be made in detail to an embodiment of the present invention as illustrated in the accompanying drawings.

A. Overview

Methods and apparatus are described that enable analysis of unstructured or structured textual information. Systems and methods consistent with the present invention prepare text for analysis and visualization in a data mining system. Text processing modules accept textual information and produce context vectors for subsequent clustering and projection into visualization systems.

The general process for producing data structured for data mining is as follows: First, the information represented by records is received in electronic form. Second, the records are indexed and analyzed to produce high-dimensional vectors. Third, the high-dimensional vectors are grouped to identify relationships (e.g. clustering). Fourth, the high-dimensional vectors are converted to a two-dimensional representation, a projection, for use by a display system for viewing the collected data. This process also produces indices that facilitate high-speed lookup of words in the data sources. The processes discussed herein assume that the format of the electronic data of textual information to be analyzed has been identified, either manually or by an automated subsystem that precedes the processes described.

Having determined the format of the text to be processed, systems and methods consistent with the present invention identify attribute fields associated with a record that contain textual information, identify the content of the textual information, and generate an index that associates the specific text contained within a particular attribute field with the particular attribute field so that the text of the particular field may be analyzed in relation to other fields.

Text processing consistent with the present invention may be organized into two phases: an indexing phase and vectorization phase. In the context of a data table, in the indexing phase, words are obtained from text cells of a data table to form a vocabulary. Indices are built that facilitate lookup of words contained in a row and that facilitate lookup of rows containing a word. In the vectorization phase, the topicality of each word is computed. Topicality is value that indicates the ability of a word to express the content of a document and differentiate it from other documents. Terms with high topicality values are designated as major terms and a context vector for each data table row is computed based on the frequency of occurrence statistics of the major terms in that row. A context vector is a mathematical signature of an item of text, which serves to identify the text. As used herein, a row generally represents a particular record or object having multiple attributes.

Systems and methods consistent with the present invention enable: (1) text from any data record, even of mixed data type, to be indexed and vectorized for subsequent analysis; (2) the resulting index to reference individual cells in the data table or specific fields in the text, which enable analysis and comparison of information contained in the individual cells or fields; (3) indexing and vectorizing to be made case-sensitive or -insensitive; and (4) multiple topicality calculation methods to be applied.

B. Terminology

The detailed description makes frequent reference to several terms, which are described as follows:

Data Table—Text, numbers, or other data types arranged in a two-dimensional matrix of rows and columns. A particular data table contains the text of a particular set of source records. For completely unstructured text (that is, text having no specified sections), the data table consists of two columns—one column is an identifier for the document (number, file name, etc.) and the other is the full content of the document. For structured text (that is, text having identifiable sections), the data table may consist of multiple columns, each representing a different section of the record or document. For a generic data record, the data table may have data of a specified type, including text, within each column.

Row—A horizontally defined area in a data table. A row corresponds to a single record including any text within the data source.

Column—A vertically defined area in a data table. A column corresponds to a field in the data source and may contain textual information.

Record—An individual data source.

Field—A tagged (delimited) paragraph or identifiable subsection in a data source.

Cell—The entity at the intersection of a row and a column in a data table. The text contained in a cell corresponds to the text in a particular tagged field in an individual source document.

Term—One of the words of text from the overall data set, for example as represented by a data table. Each vocabulary word present in the text portion of the data records can be a term.

termID—An entity that identifies each vocabulary word. For example, an integer value that identifies a particular vocabulary word.

cellID—An entity that identifies a section of each data record. Within a data table, this could be an encapsulation of a row identification index and column identification index to uniquely identify a data table cell.

FreqTerm—A reference to vocabulary words and the manner in which they are distributed (frequency or distribution), for example, a class that encapsulates a termID and the frequency-of-occurrence of the associated term in a data table cell. FreqTerms are the basic units of information in the cell-to-term index file and data structures.

FreqCell—A reference to specified sections of a data record and the statistics of word usage within that section, for example, a class that encapsulates a cellID and the frequency-of-occurrence of a term in the cell. FreqCells are the basic units of information in the term-to-cell index file and data structures.

TopicTerm—A reference to vocabulary words along with the likelihood that the word is useful for conveying discriminating information about the data record; for example, a class that encapsulates a termID, a term strength indicator, and a topicality value. TopicTerms contain the basic units of information in the topicality file and data structures.

Term Strength Indicator—A measure of the term's ability to convey information about the subject matter of a record or document. As discussed herein, the term strength indicator is a quantity with one of three possible values, "topic," "cross term," or "minor term."

Vocabulary—A list of all the terms, other than excluded terms, which comprise a document set. The excluded terms as discussed herein are stopwords and selected numeric strings.

Topic—A reference to specific vocabulary words determined to be useful for conveying discriminating information about the data record; for example, a term chosen to represent one dimension of the set of context vectors for a data set. A topic is indicated herein by a high topicality value.

Cross Term—A reference to specific vocabulary words that are not topics yet provide some discriminating information about the data record; for example, a term chosen because its presence in a record or document infers the meaning of one or more of the topics. A cross term is indicated herein by a topicality value that is lower than the topicality value of the lowest-valued topic and is considered significant topicality value.

Major Term—A class of vocabulary words that convey any useful discriminating information about the data records; for example, a topic or cross term.

Minor Term—A word from the vocabulary that is not a major term. A minor term is indicated by a low topicality value that is lower than the topicality value of a cross term.

Stopword—A term overtly designated for exclusion from the vocabulary. Typically, stopwords include conjunctions, pronouns and other words that would influence the word-occurrence statistics but contribute little to no information about the subject matter of a data record or document.

Context Vector—The mathematical signature of a data record. The vector can be the signature for an item of text, which serves to identify the text. A context vector is indicated herein by an array of numerical strength values, usually but not necessarily one-dimensional, where each strength value is based on a statistical analysis of the frequency-of-occurrence of words in the data set in which the text item is imbedded. As discussed herein, the number of elements in a context vector equals the number of topics in the data set corresponding to a set of source records. Each element of the vector is a numeric quantity expressing the strength of a single topic in the item of text that the vector represents.

Record Vector—The context vector describing the aggregate signature of the full record or the portion of the record chosen for analyses; for example, from the textual cells of an individual record in a data table.

Term Vector—The context vector describing the signature of a single word in terms of its strength of similarity to other words in the data set.

Topicality—A mathematical quantity that indicates the ability of a particular feature, such as a word, to express the content of a record or document and differentiate it from other records or documents in a set. Topicality can be statistically derived, such as given by the formula $$T=N(1-(1-1/N)^M)/A$$

where N is the total number of records in the data table,

M is the total number of times the term appears in the data table,

A is the actual number of records in which the term is observed, and

T is the resulting topicality value for the term.

The numerator of this formula gives the number of records in which the term is expected to be observed, based on term occurrence statistics for the entire data table. Thus, topicality is just the ratio of the expected to actual number of records in which the term is observed.

Association Value—An entity that indicates the overall likelihood that a specific feature conveys content; for example, a number that indicates how strongly a major term implies a topic. An association value is indicated herein by a number in the range of (0.1). A value of 1.0 indicates that the major term's appearance in a record has the same implication as if the topic were in the record. A value of zero indicates that the major term does not imply the topic at all.

Association Matrix—An array of association values. As discussed herein, the association matrix is a two-dimensional array. One axis corresponds to topics, the other to major terms. Each cell in the matrix contains the association value pertaining to the intersecting topic and major term.

C. Architecture

Referring to FIG. 1, a block diagram is shown of a data visualization and data mining system 10. The data visualization and data mining system includes a data set importation and creation system 100, a view creation system 101, and a data exploration and mining system 102. The data set importation and creation system 100 imports data sets and enables the creation of a data set customized to a user's desires and useful for generating visualizations. The view creation system 101 enables the set-up of data visualizations from imported data and the creation of underlying structures used by the data exploration and mining system 102. The data exploration and mining system 102 presents visualizations of user-defined views of the data, and enables interactions through one or more tool sets. Typically, the data visualization and data mining system 10 is embodied in a computer system and accesses electronic information from within its data stores or from other systems to which it is connected. The systems 100, 101, and 102 typically include computer program modules accessible from the memory of a computer system.

Figure 2:
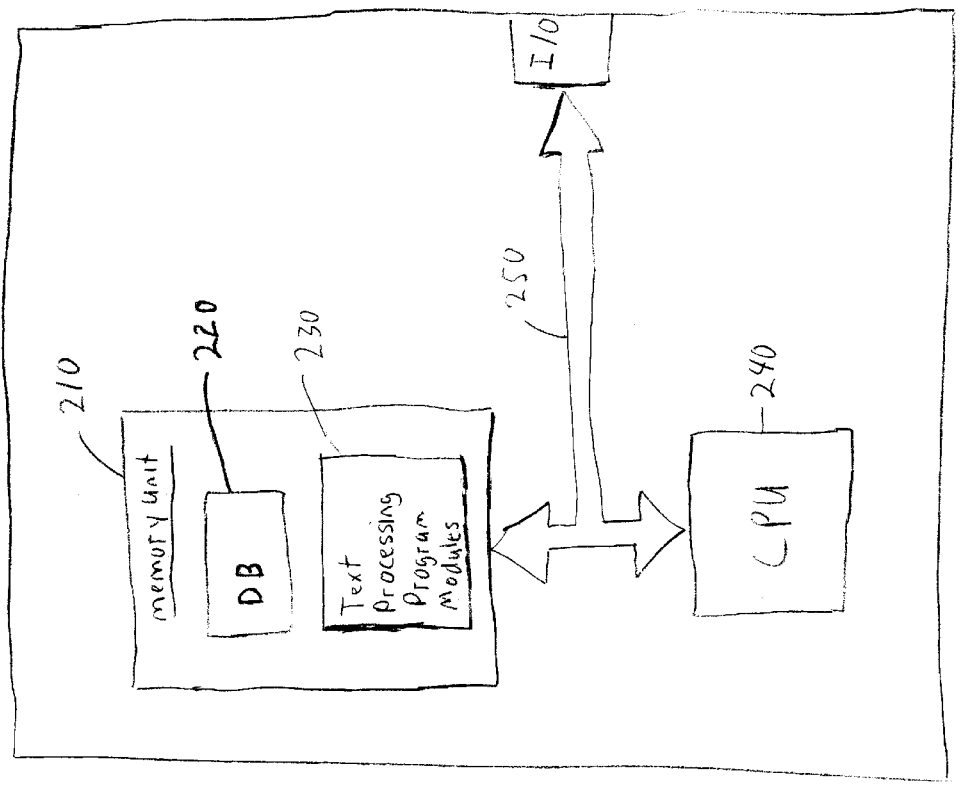
FIG. 2 is a block diagram of a computer system consistent with the present invention operable to implement processes consistent with the present invention.

A system consistent with the present invention provides an improved system for a data analysis system. Referring to FIG. 2, a more detailed view of the data presentation and mining system 102, consistent with the present invention, is shown. The data presentation and mining system 102 is embodied in a computer system. Computer programs used to implement methods consistent with the present invention are generally located in a memory unit 210, and the processes of the present invention are carried out through the use of a central processing unit (CPU) 240 in conjunction with application programs or modules. Those skilled in the art will appreciate that memory unit 210 is representative of read-only, random access memory, and other memory elements used in a computer system. For simplicity, many components of a computer system have not been illustrated, such as address buffers and other standard control circuits. These elements are well known in the art.

Memory unit 210 contains databases, tables, files 220 and text processing program modules 230 that are used in carrying out the processes associated with the present invention. CPU 240, in combination with computer software and an operating system, controls the operations of the computer system. Memory unit 210, CPU 240, and other components of the computer system communicate via a bus 250. Data or signals resulting from the processes of the present invention are output from the computer system via an input/output (I/O) interface, which may be coupled to a display monitor for viewing and user interaction. The I/O interface may be coupled to an input and/or a selection device, such as a keyboard or mouse, for receiving input from a user. Object oriented programming is suitable for programming the functions and modules consistent with the present invention, although one skilled in the art will recognize that other suitable methods are available.

D. Processes

1. The Indexing Phase

Figure 3:
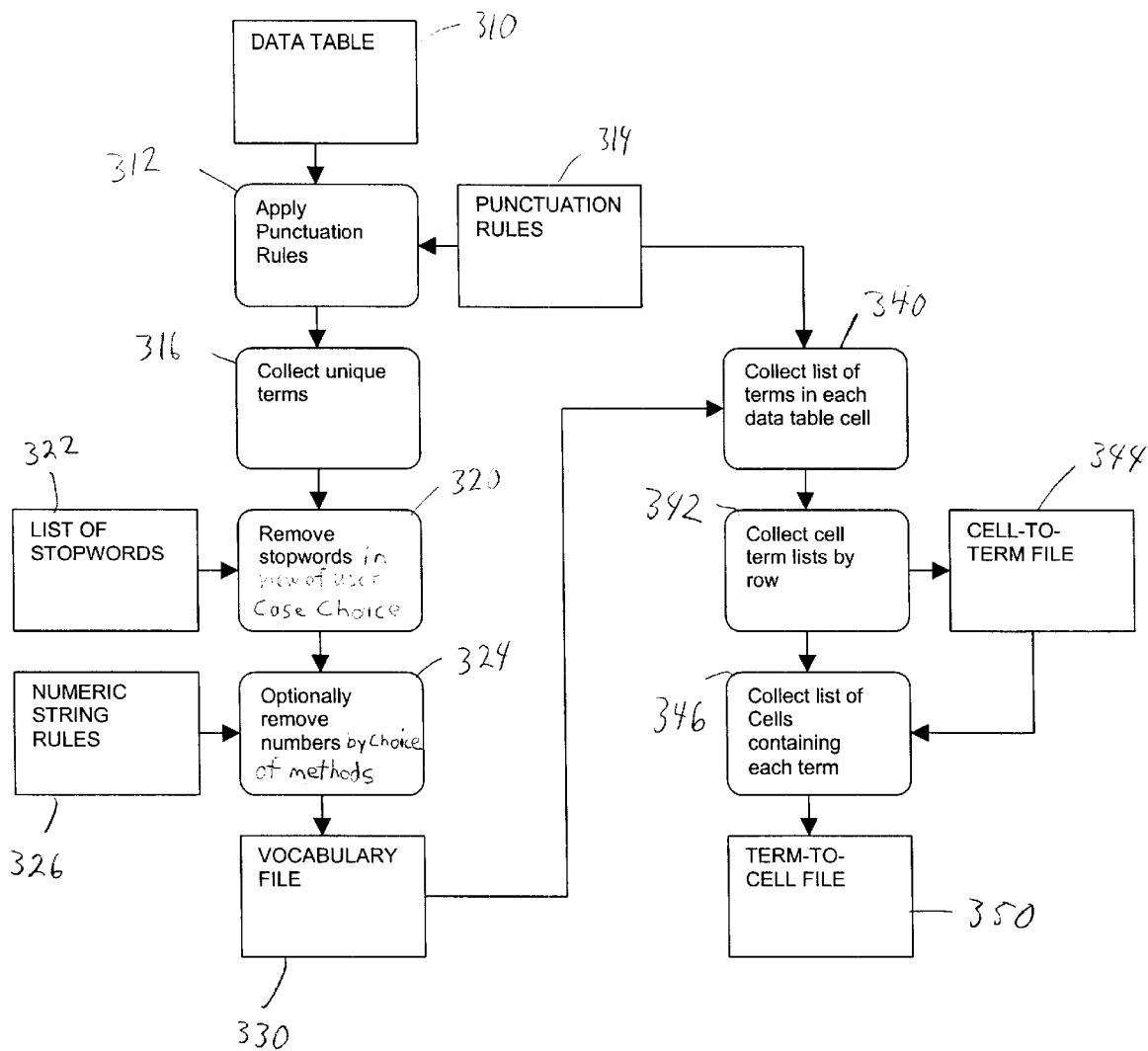
FIG. 3 is a flow diagram of a text indexing process consistent with the present invention.

Referring to the FIGS. 3 (indexing phase) and 4 (vectorization phase), processes consistent with the present invention are described. These processes are discussed in connection with a data table that may have text information along with other data in each record. However, one skilled in the art will recognize that the processes discussed herein apply to other data models. It should be appreciated that the processes described herein are implemented in conjunction with execution of the program modules 230.

The first phase of indexing begins with the creation of a vocabulary, generally illustrated from block 310 to block 330. As part of creating the vocabulary all words in a data table are catalogued. The cataloging of the words is encapsulated within a Java class called Vocabulary. The Vocabulary class creates, and manages access to, the persistent list (i.e. written to disk) of words that comprise the significant textual content of a data table. The list is implemented as a linear file, the "vocab" file, of words (i.e., strings without imbedded white space), and is accessed via offsets in a corresponding index file, the "vocab-ndx" file. This set of two files establishes the relationship between vocabulary word strings and integer term identification numbers, called "termIDs."

The word strings in the vocab file are ordered alphabetically to facilitate quick lookup via binary search. The alphabetical ordering, together with the use of the vocab-ndx file, makes it efficient to convert between a term string and a termID since both are ordered similarly. By reducing word strings to numbers, storing and manipulating "words" become more efficient by operating with numbers rather than strings. Once converted to numbers, terms are converted back to strings preferably only when presented to humans at the user interface.

To collect the word strings for the vocabulary, an iteration through the data table by row and by column is carried out, and the single string of text is parsed from each cell. Since only data table columns that contain text are of interest for text processing, and not other columns such as numeric columns data only, the columns are defined. This can be accomplished with a data type determination subsystem or the type can be read from a previous process. For example, in the latter case, previous steps may indicate a set of columns in the data table that are text columns and define which columns to iterate through with the column iterator.

Referring specifically to FIG. 3, the steps of the text indexing procedure are described. Rectangular boxes indicate inputs and/or outputs to and from the process steps. First, a data table containing text information is accessed (block 310). Next, a vocabulary is built by parsing the text found in each of the cells and by applying punctuation rules (step 312) obtained from the user's input (block 314), in which punctuation characters may be converted to other characters or eliminated altogether. The user specifies punctuation rules prior to initiating processing. The string resulting from the application of punctuation rules is then tokenized (that is, the string is treated as a single object or token), yielding a sequence of white space-delimited words. Each of these words is placed into a hash set, which is a collection of objects that culls out duplicates (step 316) (i.e. duplicate words are not included in this set). When all the columns and rows in the data table have been traversed, the hash set will contain an unordered list of unique words, including any words generated by applying the punctuation rules to white space-delimited strings with embedded punctuation characters. In this context, embedded punctuation refers to punctuation marks within a word or phrase that is integral to that word or phrase, such as the hyphen in IL-6.

The next step is to remove stopwords (step 320). The stopword list (block 322) contains all the words that should be ignored, in the form of lower-case strings. The user may want to choose either case-sensitive or case-insensitive vocabulary generation options.

If the vocabulary is to be case-sensitive, that is, to consider case when matching word strings, the hash set uses an array of mixed-case words. This array is then sorted alphabetically, and stopwords removed from the sorted array by matching each member of the stopword list (block 322) with each word in the array without regard for case.

If the user has chosen to create a case-insensitive vocabulary, each member of the stopword list (block 322) can be removed from the hash set directly, and then the array of surviving vocabulary words is created and alphabetically sorted. Note that the case-insensitive algorithm is more efficient than the case-sensitive algorithm.

The final step in vocabulary creation is to apply either or both of the available numeric-string rules (block 326) that the user may have specified (step 324). The user can opt to remove mixed alpha-numeric words (e.g., U235, F15E, etc.). Independently, the user can omit pure integer strings (e.g., 5, 123, etc.). A numeric filter algorithm examines each character of each word in the candidate vocabulary to see if it's a digit, and then applies the designated rule or rules (step 324).

At this point, the completed vocabulary exists as a list of strings in memory. Each string is written to the vocab file (block 330), and its length used to compute and write its offset to the vocab-ndx file. The vocab-ndx file is discussed in more detail below. During this process, track is kept of the longest word encountered (since this may be relevant to subsequent analytical or visualization methods) and this, along with reporting the progress of the entire process, is reported to the user via an informational text window or a file (processing log).

Once the vocabulary is created, text indices can also be created (generally, from step 340-block 350), a procedure that's encapsulated within a Java class called TextIndexer. The TextIndexer class creates, and manages access to, persistent (i.e., written to disk) indices to the vocabulary words of a data table; the index uses the termID rather than the actual vocabulary word. These indices are maintained in the "cell-to-term" and "term-to-cell" files and their corresponding offset files, "cell-to-term-ndx" and "term-to-cell-ndx." This set of four files establishes the relationships between a data table's cells and its vocabulary words (forward relationship) and between vocabulary words and the table cells (backwards relationship).

The TextIndexer may accommodate either 32-bit or 64-bit file offset values. Initially, 32-bit offset values are created but, if the data table is very large and the vocabulary contains many words, it's possible for the index files to grow beyond the point where they can be addressed with 32-bit offset values. If this happens, the TextIndexer resets itself and starts over using 64-bit offset values.

Here, as when building the vocabulary, only text columns, not numeric or other kinds of columns, are of interest. Again, an indication of which columns are text can be indicated by automatic determination or as a result of previous manual or automatic steps. Then only those text columns are iterated through.

Next, four files that will be created are initialized: cell-to-term, cell-to-term-ndx, term-to-cell, and term-to-cell-ndx. An array of cell counts is also initialized to keep track of the number of cells in which each term is found. The cell count information is collected while the cell-to-term file is built, and used later, when the term-to-cell file is built (step 346). An array in which to collect cell-to-term file offset values, defining position within the table, is also initialized (within block 344).

After files are initialized, the term-to-cell files are ready to be built. As for building the vocabulary, the data table is traversed through by row and by text column and the text from each cell examined. As discussed above, punctuation rules are applied to each cell's text string and the result is tokenized into a sequence of white space-delimited words. Then, each word is located in the vocabulary. A numeric termID is returned from the vocabulary file for each word unless the word is a stopword. This termID is used to create an instance of a class called a FreqTerm. A FreqTerm encapsulates a termID and a frequency-of-occurrence value, which is a count of the number of times the term appears in a cell. Now this new term is located in the list of FreqTerms for the current cell. A binary search can be used for this, since these lists are kept ordered by termID. If the term is not found, it is inserted in the list of FreqTerms at a position that maintains the termID (therefore alphabetical) order of the list. This term's count is also incremented in the array of cell counts that is concurrently being built. If the term is found to be already present in this cell's list of FreqTerms, the FreqTerm's frequency-of-occurrence value is just incremented to account for another occurrence of the term in the cell's text.

When all the words in the current cell are processed (step 340), a complete list of FreqTerms has been created for that cell. It's possible that the list is empty, meaning that the current cell is empty, or contains only stopwords and strings eliminated by application of numeric rules. But if the list is not empty, the column count is incremented for the current row, and the current column's ID number, the current cell's term count, and the contents of each of the collected FreqTerms (a termID and a frequency-of-occurrence value) are appended to a temporary buffer. When all the columns in the current row have been processed, this temporary buffer will contain an encoding of the contents of each of the current row's text cells, in left-to-right column order. The temporary buffer will later be written to the cell-to-term file.

When the above process has been applied to each of the columns of the current row, the column count that has been kept will contain the number of non-empty text columns in the current row. This number is written to the cell-to-term file (block 344). Then the temporary buffer assembled above is written to the cell-to-term file (block 344). The steps are done in this order so that the column count will precede the column contents in the cell-to-term file. This will facilitate subsequent access to the file as a set of variable-length records.

At this point, the length of the variable-length record for the current row's entry in the cell-to-term-file is known, so this row's offset can be computed and written as its entry in the cell-to-term-index file (step 342). The potential problem of 32-bit overflow is handled at step 342; if the offset exceeds a warning threshold, 32-bit offsets are abandoned and the entire indexing process started over using 64-bit offsets.

The above process is repeated for each row in the data table. When the final row has been processed, the cell-to-term and cell-to-term-ndx files are complete. Again, a variable-length record in the cell-to-term file exists for each row in the data table. These records are structured as follows:

nC Cid nT Tid Tf Tid Tf . . . Cid nT Tid Tf Tid Tf . . .

where nC is the number of non-empty text columns in the row,

Cid is a Column identification index number, nT is the number of terms in column Cid of the row, Tid is the termID of a term in column Cid of the row (part of a FreqTerm), and Tf is the frequency-of-occurrence of term Tid in column Cid (part of a FreqTerm).

The cell-to-term-ndx file is structured as follows:

<32-or-64-bit indicator>

<offset to row 0 as a number of 32-bit words>

<offset to row 1 as a number of 32-bit words>

•

•

•

The term-to-cell files (block 350) are ready to be created. Recall that, while the cell-to-term files were being created, the count of the number of cells where each term was found were accumulated and stored in a "cell counts" array. These cell counts can be used to compute the offset values for the new term-to-cell file, so the new term-to-cell-ndx file can now be created. These computed offsets are left in an array in memory. They will be used to mark our current positions for each term while building the term-to-cell file.

The cell counts array also enables computation of the overall size of the term-to-cell file, so it can be pre-allocated. The pre-allocated, empty file can then be accessed randomly to flesh it out. The cell-to-term file can be traversed, reading it in its natural sequence, that is, by row, and fill in the term-to-cell file by accessing it randomly, by termID.

So, for each row, the number of columns in this row are read from the cell-to-term file (block 344) (refer to the cell-to-term file record structure above). For each column in the row, the column identification index number is read and joined with the row index to form a cellID. A cellID is a 32-bit row number and a 32-bit column identification number packed into a 64-bit word. Next, the number of terms for the current column is read.

For each term in the current column of the current row, the FreqTerm, i.e., the termID and frequency-of-occurrence, is read from the cell-to-term file. An instance of class FreqCell, which encapsulates a cellID and a frequency-of-occurrence of a term in that cell, is now formed. The termID is used to look up the term's current offset in the term-to-cell offset array and to seek to that position in the randomly-accessed term-to-cell file. The FreqCell, i.e., the cellID and term frequency-of-occurrence, is written at this position of the term-to-cell file (step 346). Finally, the term's entry is incremented in the array of offsets, to identify the location to write the next FreqCell for the next time the term is encountered.

When the above loops for each term within each column within each row have all been completed, the term-to-cell and term-to-cell-ndx files have been fully created. This completes the indexing phase.

2. The Vectorization Phase

The vectorization phase outputs a set of record vectors. The vectorization phase is discussed herein in the context of text processing. For text data, record vectors are produced in a class called TextVectorizer. The first part of the process of vectorizing indexed text computes the topicality of each of the vocabulary words, and the TextVectorizer saves these values in a topicality list as a by-product of vectorization. This topicality list is useful for creating certain types of visualizations.

Figure 4:
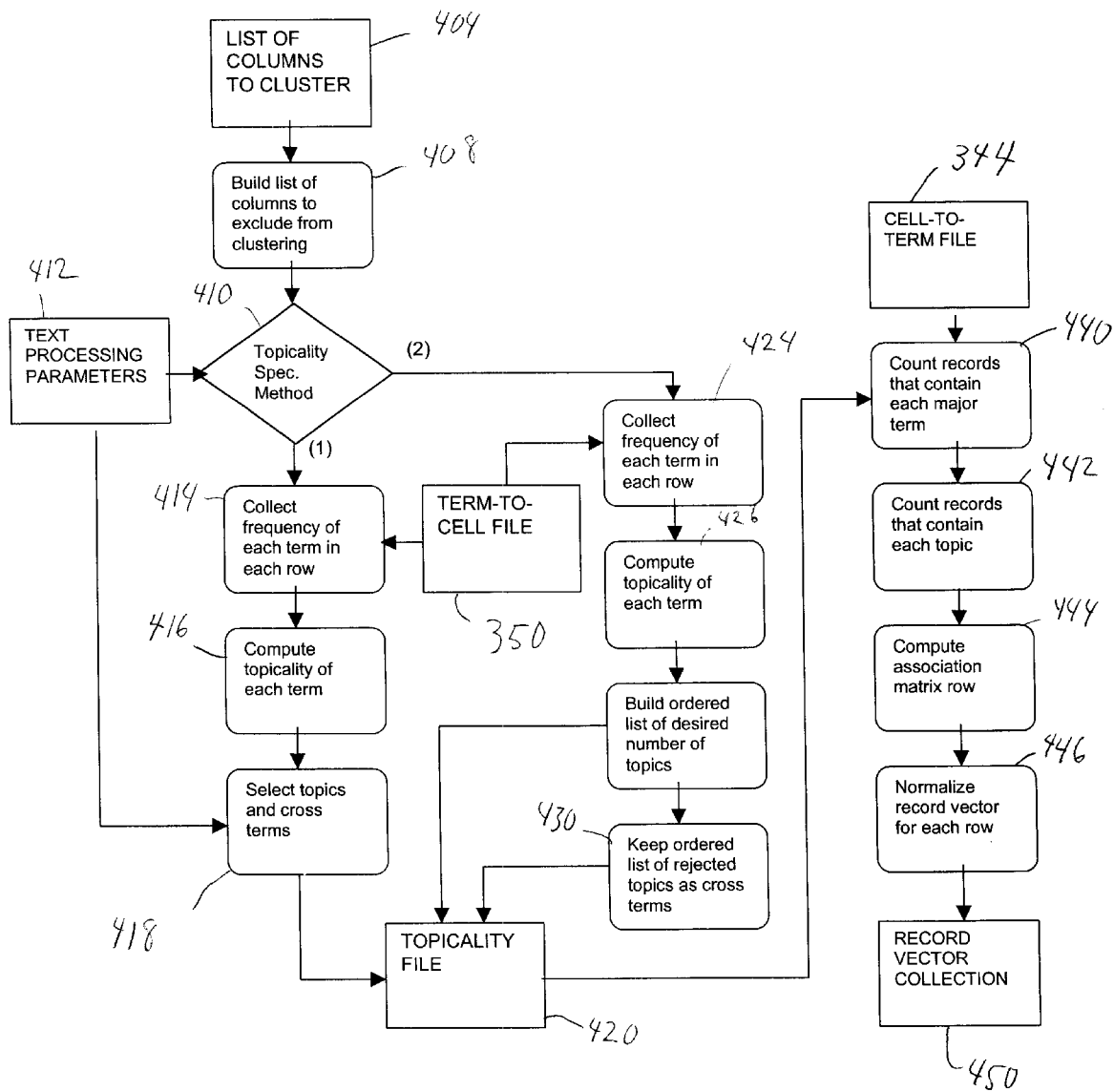
FIG. 4 is flow diagram a text vectorization process consistent with the present invention.

Referring to FIG. 4, a flow diagram of the vectorization process is shown. The TextVectorizer begins by acquiring text processing parameters from the user interface. These parameters indicate the user's wishes for the selection of topics and cross terms from the vocabulary. The user may select parameters for topics and cross terms by two (1) by overtly specifying minimum topicality values, or (2) by requesting specific numbers of topics and cross terms. The user's choice of method determines the details of operation of the TextVectorizer. The specific text processing parameters are as follows:

For Method (1):

MinTopT The minimum topicality value for topics

MinTopX The minimum topicality value for cross terms

For Method (2):

NTopicsWanted The desired number of topics

NXtermsWanted The desired number of cross terms

Other parameters that are independent of method are:

MinRT the minimum number of records in which a topic must appear minRX the minimum number of records in which a cross term must appear maxRT the maximum number of records in which a topic may appear maxRX the maximum number of records in which a cross term may appear assocThresh the association threshold, below which the association value is declared to be zero.

useAssoc a Boolean indicating whether or not the user wants to use associations at all Topicality calculations are based on term occurrence statistics, and this information is captured in the term-to-cell file (block 350). The TextVectorizer uses the TextIndexer to access this information. However, the information from the TextIndexer reflects indexed text columns, a subset of all columns in the data table, chosen by the user via a user interface. But, it is desired to compute topicalities based on just the columns that the user has designated for clustering (block 404), which may be a proper subset of the indexed columns. To facilitate this adjustment, an array of column identification index numbers is now built for columns designated as indexed text columns but not designated for clustering (step 408). This list is sorted numerically for quick lookup.

Topicalities can now be computed. Three arrays are initialized—an array of FreqCells, an array of termIDs of topics, and an array of termIDs of major terms. The user can be offered a choice for using associations or not. If the user chose not to use associations, the major terms do not have to be collected; however, topics are collected.

One of two algorithms is invoked (step 410) to pick the topics and major terms. If the user chose (block 412) topicality parameter Method (1), an algorithm is used in which the topicality file is built on-the-fly can be used in a single pass through the vocabulary. If, however, the user chose Method (2), another algorithm is used that runs through the vocabulary twice, once to order the terms by topicality, and again to write the topicality file in numerical order by termID.

Using Method (1), for each term in the vocabulary, the collection of FreqCells for this term is obtained by accessing the term-to-cell file via the TextIndexer (step 414). Recall that this collection is a list of the (row,col) cells in which this term is found, and the frequency-of-occurrence of the term in each cell.

For each FreqCell in the list for the current term, the cellID is obtained and the column ID extracted. If this column is on the list of columns to skip because the column is not to be used for clustering then the column is skipped. Otherwise, the row number is extracted from the cellID and, if the row has not already been counted for the current term, it is counted. The cell's frequency-of-occurrence value is then added to the overall frequency-of-occurrence value for this term in the data set as a whole ("M" in the topicality formula).

Now, all the statistical values for computing the topicality for the current term have been obtained. The topicality formula is applied and the result saved (step 416). The term's topicality value is then compared to the specified thresholds to determine if the term qualifies as a topic or if not, as a cross term. If the term's topicality is too low to qualify as a cross term, the term is designated as a minor term and it is not added to either of the lists. The terms that at this stage qualify as either a topic or cross term are then subjected to another (optional) test. The user may manually identify or the software can automatically calculate a range of frequency of occurrence that is meaningful (record count rules); these rules indicate the minimum or maximum number of records in which the term must occur. Thus, the minimum and maximum record count rules are used to downgrade (or lower the topicality) of the term if it appears in too many or too few records. After this, the term's final strength as a topic, a cross term, or a minor term can be assigned (step 418). The term's strength indicator and topicality value is appended to the topicality file (block 420). If the term is a topic, term's termID is appended to both the topic and major term arrays. If it's a cross term, the term's termID is appended to the major term array only.

This process is repeated for each term in the vocabulary. When completed, the result is a complete topicality file (block 420) and in-memory lists of all the topics and major terms.

If Method (2) is being employed (block 410), three lists, in addition to those discussed in connection with Method (1), are initialized: a list of prospective topics, a list of rejected topics, and a list of prospective cross terms. Also, since the topicality thresholds are not yet known, the topicality values for all the terms are kept in an additional array. This array is populated by traversing through the vocabulary, computing topicalities and building lists of the size the user desires.

For each term in the vocabulary, the collection of FreqCells for this term is obtained (step 424). This collection is a list of the (row,col) cells that contain the term and the frequency-of-occurrence of the term in each cell.

For each FreqCell in the list for the current term, the cellID is obtained and the column ID extracted. If this column is on the list of columns to skip because the column is not to be used for clustering then the column is skipped. Otherwise, the row number is extracted from the cellID and, if the row has not already been counted for the current term, the row is counted. Then the cell's frequency-of-occurrence value is added to the overall frequency-of-occurrence value for this term in the data set as a whole ("M" in the topicality formula).

Now, all the statistical values for computing the topicality for the current term have been obtained. The topicality formula is applied and the result appended to the array of topicality values, which will be sorted later (step 426). If the term potentially qualifies as a major term (topic or cross term) based on row count maxima and minima, a TopicTerm, (i.e. an instance of a class that encapsulates a termId), a strength indicator, and a topicality value, is created.

Next, the following qualifying procedure is invoked to keep the current term as a topic if the term is currently qualified as a topic (step 428):

The user may have manually indicated or the system may have automatically calculated a range of topicality values that are meaningful for the particular analysis. The list of topic and cross terms is compared to the allowable range for topicality and those not meeting the range criteria are removed from the list and added to a separate list of rejected terms.

Next, a second qualifying procedure is applied. Optionally, the user may have specified or the system automatically calculated an absolute number (N) of topics or cross terms that should be used. From the topicality-ordered list of terms that remain after the first qualifying process, the terms below the absolute number to be allowed (that is, terms N+1 and larger) are removed and place on the list of rejected terms. To ensure that all terms of equal topicality are treated equally, terms remaining on the list that have the same topicality as the N+1th term are also removed. The process starts by determining if the term's topicality is greater than the lowest value on the list. If so, the term is inserted in the list, whether or not its topicality ties one or more values that are already there. The insertion is done such that the list stays ordered by decreasing topicality. If the list already has more than the desired number of terms, this list is traversed backward, from bottom to top, to find the lowest point where the topicality values change (breakpoint), that is, the breakpoint closest to the end of the list. Then, if the list is has more members than allowed by the absolute number that should be allowed, all of the terms with the lowest topicality value are removed, thus enforcing the rule that in case of ties, duplicate rewards (or punishment) will be given. If cross terms are being collected, rejected terms are deleted. However, if topics are being collected, each rejected topic is set aside (placed in memory) for possible recycling as a cross term.

If there are one or more terms that were removed from the list as topics by the current term, the qualifying procedure is invoked again to possibly keep each of these displaced topics as a cross term (430).

The entire vocabulary is traversed performing this qualifying procedure on each term. After the qualifying procedure has been performed on each term, lists of TopicTerm for topics and for cross terms exist. These lists are sorted by topicality value. Now, arrays of termIDs for topics and for major terms are needed, sorted by ascending termID (i.e., alphabetically). Therefore, the topics and cross term lists are traversed and the termIDs are extracted from the TopicTerms, then the termIDs are appended to the arrays. The arrays are sorted by TermID to order the topics and crossterms alphabetically.

Now, the terms are traversed again and written to the topicality file (block 420), each record of which consists of a term strength indicator and a topicality value. The topicality file has a record for each vocabulary term. The termID is implied by a record's position in the file. As the range of termIDs is traversed, each term's strength is determined based on it being in the topic array, the cross term array, or neither. The term's topicality value is obtained from the array of topicality values that was kept ordered by termID. Once the range of termID's has been traversed, a complete topicality file is obtained, and in-memory lists of all the topics and major terms is obtained, for Method (2) processing.

Regardless of topic selection method, the record vectors are ready to be computed. If the user chose to use associations (the default assumption), term co-occurrence statistics for topics and cross terms have to be gathered and the association matrix computed. Actually, the association matrix does not exist in totality at one time; each row of the association matrix is computed and stored separately, used to compute the record vector for the corresponding row, then the association matrix row discarded. In other words, only "association matrix" rows are used on a step-by-step basis.

Term co-occurrence statistics are obtained from the cell-to-term file, which is accessed through the TextIndexer. For each record (i.e., data table row), an array of floats in which the record vector for this record is accumulated is zeroed out. This array has an element for each topic, since topics correspond to dimensions of the vectors. Next, the record's terms are obtained, in the form of an array of FreqTerms. Then, for each term in the record, a binary search lookup is performed to determine if the term's termID is on the list of major terms (step 440). If so, the term's frequency-of-occurrence is remembered within the current row.

For each topic, that is, for each dimension of the record vectors, it is determined if the topic is also the major term currently being considered (step 442). If it is, the term's frequency-of-occurrence is added to the topic's element of the record vector. However, if the topic is not the current major term, the association value for this major term with this topic is computed by dividing the count of records with both terms by the count of records with the topic. Next, the association value is clipped to the specified association threshold, that is, the association value is set to zero if it's below the threshold. The result is used to weight the major term's frequency-of-occurrence and this weighted value is added to the topic's element of the record vector (step 444).

Step 444 is repeated for each term in the current record. The current record's vector is normalized such that the sum of its elements is 1.0, and it is put in the vector collection for the data set (step 446).

If the user opts not to use associations, the process of creating record vectors is less involved. Since there are no cross terms, the term vector for each topic will have a non-zero value in only one column, that being the column corresponding to the topic itself, and that value will be unity. For each row, the record vector is cleared and the list of FreqTerms is obtained. Then for each of the row's Freq-Terms that's a topic, its value in the record vector is set to its frequency-of-occurrence value in the record. When all the record's FreqTerms have been traversed, the record vector is normalized and put it in the vector collection.

To complete the vector collection, the term string is obtained for each of the topics from the Vocabulary, and this string set as the column heading for each column of the vector collection.

Finally, the vector collection is saved to a file (block 450). This vector collection can then be used for a number of processes including clustering and visualization of the relationship among records.

As described above in detail, methods and apparatus consistent with the invention allow vector creation and indexing of text data from any data record, including unstructured or structured text.

The foregoing description and example implementation is for the purpose of illustration and description. Modification and variation of the described embodiment are possible in light of the above teachings. For example, in each phase of the process, a synonym list or thesaurus can be used to account for similar words or to tokenize (that is, treat as single entities) phrases such as names. It should also be appreciated that although the data model described referred primarily to a data table and processing text within a cells of the data table, other data records models may be used for identifying records and attributes associated with those records. For example, a data file may have data records and attributes associated with those data records identified by predefined delimiters. Based on the location of the delimiters, data records and text may be evaluated by the text processing procedures and methods described herein.

The particular implementation described has been carried out as software using JAVA. However, one skilled in the art will recognize that the methods are independent of specific computer language or architecture and can be accomplished on a variety of platforms and may be workstation-based or distributed as through a client-server architecture. Moreover, the implementation may be accomplished through a combination of hardware and software or solely on one or the other.

What is claimed is:

1. A method of processing text for analysis in a text processing system, comprising:

receiving a plurality of data records, each data record having one or more attribute fields, each field being associated with a different section of the record and wherein at least one of the attribute fields contains textual information;

identifying the specific textual content of each field containing textual information;

generating an index that associates the specific textual content with the attribute field containing the specific textual content, wherein said index is operable for use in text processing; and generating a vector for each data record that differentiates the textual information of that data record based on the specific textual content contained in at least one of that record's attribute field(s).

2. The method of claim 1 wherein said plurality of data records are located in a data table.

3. The method of claim 2 wherein said textual information is contained with cells of said data table.

4. The method of claim 3 wherein said data records represent rows in said data table and columns of said table correspond to the attribute fields.

5. The method of claim 1 wherein said textual information includes a plurality of terms and wherein said step of generating an index comprises associating each term with the attribute field containing the term.

6. The method of claim 1 wherein only a selected number of the attribute fields containing textual information are used to generate said vector.

7. The method of claim 1 further comprising receiving a user selectable command for generating said index with textual information indexed either based on the case of the textual information or not based on the case of the textual information.

8. The method of claim 1 wherein said textual information is indexed in a manner that enables the textual information contained within different attribute fields to be compared.

9. The method of claim 1 wherein said data records and associated attribute fields are identified by record and attribute delimiters designated for a particular file format.

10. The method of claim 1 further comprising the step of enabling a user to specify the removal of numeric strings or combination of alphabetic and numeric strings from being considered as part of said textual information.

11. A method of processing text for a data analysis and mining system, comprising the steps of:

receiving a plurality of data records, wherein at least some of the data records contain text terms;

applying a first method to weight text terms of the data records in a first manner to aid in distinguishing records from each other in response to selection of said first method;

applying a second method to weight text terms of the data records in a second manner to aid in distinguishing records from each other in response to selection of said second method; and generating a vector to distinguish each of said data records based on the text terms weighted by either the first or second method.

12. The method of claim 11 further comprising the step of weighting only text terms corresponding to selected criteria.

13. The method of claim 12 wherein said data record is a table.

14. The method of claim 12 wherein said selected criteria is based on columns selected from said data table.

15. The method of claim 11 wherein said steps of applying said first and second method comprise applying topicality methods.

16. The method of claim 15 wherein said first method includes receiving user specified topicality values.

17. The method of claim 16 wherein said second method includes receiving a number of topics and cross terms for deriving topicality values.

* * * * *

UNITED STATES PATENT AND TRADEMARK OFFICE
CERTIFICATE OF CORRECTION

PATENT NO. : 6,665,661 B1  Page 1 of 1
DATED : December 16, 2003
INVENTOR(S) : Vernon L. Crow et al.

It is certified that error appears in the above-identified patent and that said Letters Patent is hereby corrected as shown below:

<u>Title page,</u>
Item [75], Inventors, "Calaprist," should read -- Calapristi --.

Signed and Sealed this

Twentieth Day of April, 2004

JON W. DUDAS
*Acting Director of the United States Patent and Trademark Office*